Figure 1:
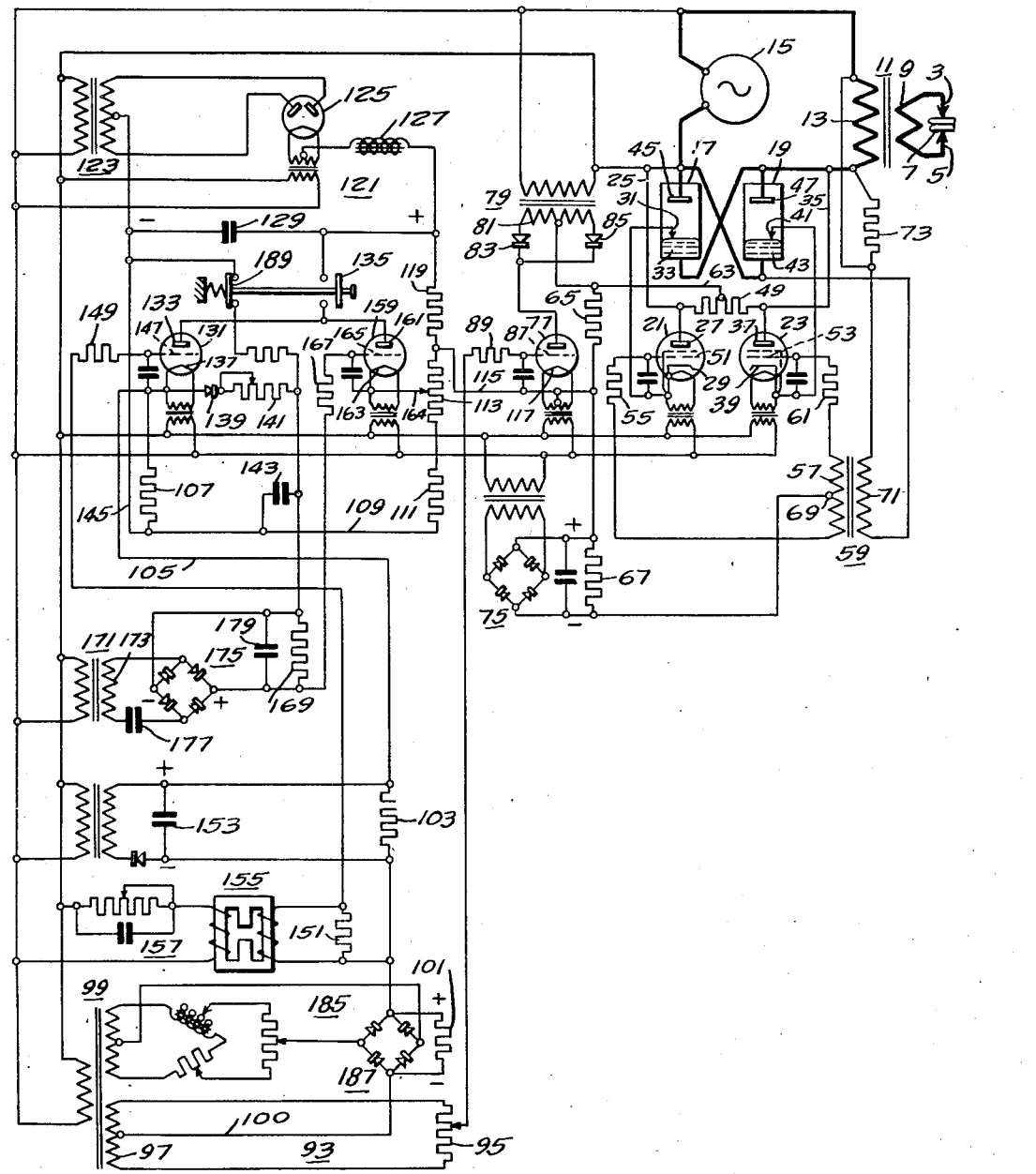

Sept. 26, 1944.    S. J. MURCEK    2,359,142
ELECTRONIC TIMING CONTROL
Filed Sept. 15, 1942    2 Sheets—Sheet 1

WITNESSES:
E.A. McCloskey.
John R. Shipman

INVENTOR
Slavo J. Murcek
BY
Hymen Diamond
ATTORNEY

Patented Sept. 26, 1944

2,359,142

UNITED STATES PATENT OFFICE 2,359,142

ELECTRONIC TIMING CONTROL

Slavo J. Murcek, Duquesne, Pa., assignor to Westinghouse Electric & Manufacturing Company, East Pittsburgh, Pa., a corporation of Pennsylvania Application September 15, 1942, Serial No. 458,375

17 Claims. (Cl. 250—27)

This invention relates to an electronic timing control, and has particular relation to a system in which current is supplied from a source of power to a load under the control of electric discharge valves.

In resistance welding apparatus constructed in accordance with the teachings of the prior art, a pair of inversely connected ignitrons is interposed between an alternating current source and the welding transformer for controlling the flow of current to the transformer. For each weld, the ignitrons are rendered conductive alternately in successive half periods of the source during a predetermined interval of time, which is measured in terms of periods or half periods of the source. The time of conductivity of the ignitrons is measured by a timing system, such as is shown in the patent to John W. Dawson, No. 2,189,601. The timing system includes an electric discharge device known as the start valve and another electric discharge device known as the stop valve. Conductivity of the start valve is initiated at the beginning of a weld period for while the start valve is conductive, the ignitrons are conductive. When the stop valve becomes conductive, the ignitrons are rendered non-conductive. However, the control circuit of the stop valve includes a biasing potential which tends to maintain the stop valve non-conductive. A capacitor in the control circuit of the stop valve is also in circuit with the start valve in such manner as to be charged at a preselected rate from the instant the start valve becomes conductive. After a predetermined interval of time, the capacitor attains a potential sufficient to counteract the biasing potential and render the stop valve conductive which in turn renders the ignitrons non-conductive.

The prior art system as described operates quite satisfactorily. However, different users of the apparatus desire to operate it from power sources having different frequencies. For example, one person may wish to use the apparatus with an alternating-current source of a 50-cycles per second frequency, while another may wish to use it with a source having a 60-cycles per second frequency, and still another may wish to use it with a source having a 62.5 cycles per second frequency. Such a difference in the frequency of the sources with which the apparatus may be used imposes a burden on the manufacturer of the apparatus. Since it is standard practice to calibrate the apparatus to measure cycles of current delivered, the apparatus is customarily manufactured with the values of the circuit elements and the calibration arranged so that the apparatus may be used with a standard frequency, such as 60 cycles per second. Therefore, when the apparatus is to be used with a different frequency, the manufacturer must readjust the circuit values and recalibrate the apparatus for each different frequency.

It is accordingly an object of my invention to provide novel apparatus for supplying power to a load from a periodically pulsating source for a predetermined number of periods of the source regardless of the frequency thereof.

Another object of my invention is to provide an improved electronic timing system which includes frequency compensating means enabling the system to be used with periodically pulsating sources having different frequencies.

More specifically, it is an object of my invention to provide novel apparatus for supplying power to a load from any selected one of a plurality of alternating-current sources having several different frequencies, in which the number of periods of current supplied is substantially the same regardless of which of said sources is selected.

In accordance with my invention, the length of the time interval during which current is supplied to the load is made dependent upon the frequency of the source. To determine the length of the time interval in accordance with the frequency of the source in apparatus similar to that hereinbefore described, the magnitude of the biasing potential in the control circuit of the stop valve is made dependent upon the frequency of the source. When the capacitor in the control circuit is charged sufficiently to counteract the biasing potential so that the resultant potential in the control circuit rises above a predetermined critical potential value, the stop valve is rendered conductive. However, as the capacitor potential increases at a fixed rate, the time required for the resultant potential to rise above the critical value depends upon the magnitude of the biasing potential impressed in the control circuit, which in turn depends upon the frequency of the source.

A potential whose magnitude depends upon the frequency of an alternating source may be developed across a resistor by passing current from the source through the resistor and a capacitor in series therewith. The reactance of the capacitor varies inversely as the frequency. Therefore, the greater the frequency the less the impedance to current flow offered by the capacitor and the greater the potential developed across the resistor. A direct current potential may be developed across the resistor by connecting a full wave rectifier between the capacitor and the resistor so that an alternating current still flows through the capacitor while a direct current flows through the resistor.

Figure 2:
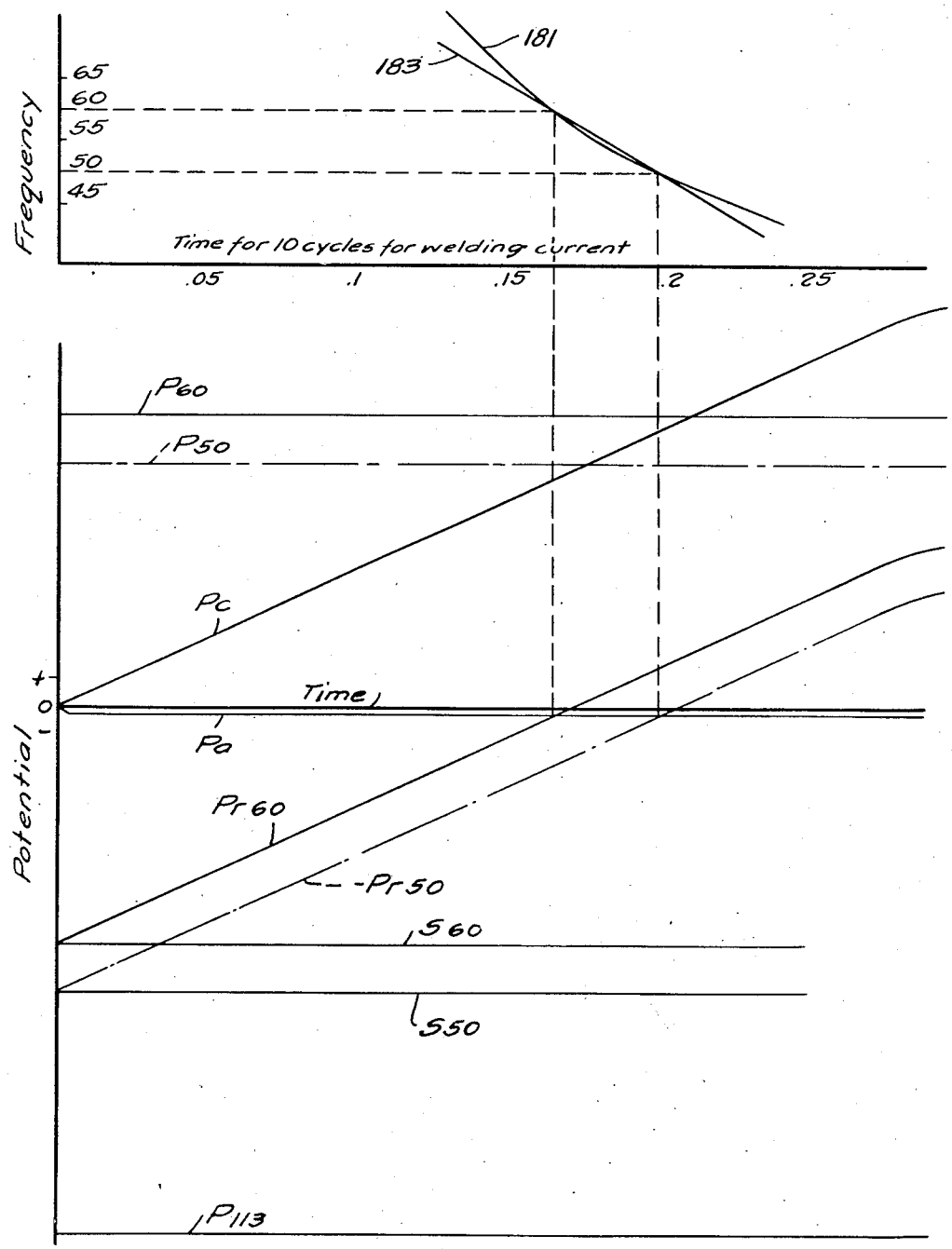

The novel features that I consider characteristic of my invention are set forth with particularity in the claims. The invention itself, however, both as to its organization and its method of operation, together with additional objects and advantages thereof, will best be understood from the following description of a specific embodiment when read in connection with the accompanying drawings, in which:

Figure 1 illustrates my invention as applied to a resistance welding apparatus; and Fig. 2 is a graph illustrating the operation of my invention.

In the apparatus shown in the drawings, a pair of welding electrodes 3 and 5 engage the material 7 to be welded and are connected across the secondary 9 of a welding transformer 11. The primary 13 of the welding transformer is supplied with power from a source of alternating-current potential 15 through a pair of inversely-connected ignitrons 17 and 19. A pair of electric discharge devices 21 and 23, preferably thyratrons, which are hereinafter designated as firing valves, are arranged to control the ignition of the ignitrons 17 and 19. The ignitron circuit for one of the ignitrons 17 extends from one side of the source 15 through a conductor 25, the anode 27 and cathode 29 of the firing valve 21, the igniter 31 and cathode 33 of the ignitron 17 and the primary 13 of the welding transformer to the other side of the source. The ignition circuit of the other ignitron 19 may be traced from the other side of the source 15 through the primary 13 of the welding transformer, a conductor 35, the anode 37 and cathode 39 of the firing valve 23, the igniter 41 and cathode 43 of the ignitron 19 to the other side of the source. It is to be noted that the anode 27 of firing valve 21 is always of the same polarity as the anode 45 of the corresponding ignitron 17, and the anode 37 of firing valve 23 is of the same polarity as the anode 47 of ignitron 19. Thus, when a firing valve becomes conductive, ignition of the corresponding ignitron is effected. When an ignitron becomes conductive, the ignition circuit through the corresponding firing valve is short-circuited by the discharge path through the ignitron, and the firing valve is rendered non-conductive. The ignitron then becomes non-conductive at the end of the half-period of the source potential in which it is ignited.

The anodes 27 and 37 of the firing valves 21 and 23 are interconnected by a resistor 49. The grid 51 of one firing valve 21 is connected to the grid 53 of the other firing valve 23 in a circuit extending through a grid resistor 55, a secondary 57 of an auxiliary transformer 59, and another grid resistor 61. The center tap 63 of the resistor 49 interconnecting the anodes of the firing valves is connected through a pair of resistors 65 and 67 to the center tap 69 of the secondary 57 of the auxiliary transformer 59. The control circuit of the firing valve 21 may then be traced from its grid 51 through the grid resistor 55 and a portion of the secondary 57 to the center tap 69 and thence through the resistors 67 and 65 to the center tap 63 of the resistor 49. The control circuit then continues from one end of the resistor 49 through the conductor 35, the cathode 33 and igniter 31 of the ignitron 17 to the cathode 29 of the firing valve 21. The control circuit of the other firing valve 23 may be traced from grid 53 through resistor 61, a portion of secondary 57, resistors 67 and 65, a portion of resistor 49, conductor 25, cathode 43 and igniter 41 of ignitron 19 to the cathode 39 of the valve.

An alternating potential derived from the source 15 appears across the resistor 49 interconnecting the anodes of the firing valves. To eliminate the influence of this alternating potential from the control circuits of the valves 21 and 23, the primary 71 of the auxiliary transformer 59 is connected oppositely across the source 15. Thus the potential appearing across the secondary 57 of the auxiliary transformer 59 balances out the potential appearing across the resistor 49 interconnecting the anodes of the firing valves. A resistor 73 is connected across the primary of the welding transformer to absorb current surges and prevent backfire of the ignitrons.

It is apparent that the two resistors 65 and 67 are common to the control circuits of both firing valves 21 and 23. A direct-current biasing potential is impressed across the resistor 67 from an auxiliary source 75. This biasing potential is of such polarity and magnitude as to normally maintain the firing valves non-conductive. The other resistor 65 is connected in series with another electric discharge device 77 in an auxiliary circuit. The device 77 is preferably a thyratron and is designated hereinafter as the control valve. Another auxiliary transformer 79 is energized from the alternating-current source, and its secondary 81 is connected in circuit with control valve 77 and resistor 65 through a pair of rectifiers 83 and 85. The arrangement is such that a rectified alternating-current potential is thereby impressed on the auxiliary circuit. When the control valve 77 becomes conductive, current flows through the resistor 65 in series therewith until the end of the half-period of the alternating-current potential, at which time the anode-cathode potential of the control valve reaches zero and the valve ceases to conduct. The current flowing through the resistor 65 develops a potential thereacross of such polarity and magnitude as to counteract the biasing potential across the resistor 67 in the control circuits of the firing valves. The particular firing valve whose anode is positive at the instant the control valve becomes conductive, is then rendered conductive to effect ignition of the corresponding ignitron.

The control circuit for the control valve 77 may be traced from the grid 87 thereof through a grid resistor 89, a balancing bridge 93 including a resistor 95 and secondary 97 of an auxiliary transformer 99, conductor 100, resistors 101 and 103, conductor 105, another resistor 107, a conductor 109, a pair of resistors 111 and 113 and conductor 115 to the cathode 117 of the valve. The pair of resistors 111 and 113 are connected in series with a third resistor 119. A direct-current potential is impressed across the series connected resistors 111, 113 and 119 from an auxiliary source 121 comprising a transformer 123, a rectifier 125 and filtering elements 127 and 129. As will be explained hereinafter, the potential thus developed across the resistors 111 and 113 in the control circuit of the control valve 77 is of such polarity and magnitude as to render the grid 87 highly negative with respect to the cathode 117.

An electric discharge valve 131, preferably a thyratron, has its anode 133 connected through a push-button switch 135 to the positive terminal of the direct-current source 121. The valve 131 is designated as a "start" valve and its cathode 137 is connected through a rectifier 139, a potentiometer 141, a capacitor 143 and a conductor 145 to the negative terminal of the source. The resistor 107 is connected in parallel with the rectifier 139, potentiometer 141, and capacitor 143. Thus, when the start valve 131 is conductive, the terminal of the resistor 107 which is connected to the cathode 137 of the start valve becomes positive with respect to the cathode 117 of the control valve 77. As a result, the grid 87 of the control valve becomes less negative with respect to the cathode 117.

The control circuit of the start valve 131 may be traced from its grid 147 through a grid resistor 149 and resistors 151 and 103 to the cathode 137. A direct-current biasing potential is impressed across the resistor 103 from an auxiliary source 153 and is of such polarity as to tend to maintain the start valve 131 non-conductive. A potential impulse is periodically impressed across the resistor 151 through an impulse transformer 155 energized from the alternating-current source 15 through a phase-shifting circuit 157. The phase-shifting circuit 157 is adjusted so that the potential impulse is impressed across the resistor 151 at an instant in the period of the alternating-current source corresponding to the power factor of the load. The potential impulse across the resistor 151 is sufficient to counteract the biasing potential across the resistor 103. Thus, when the push-button switch 135 is closed, the start valve 131 is rendered conductive by the next succeeding potential impulse across the resistor 151.

Current flowing through the start valve 131 charges the capacitor 143 at a rate determined by the setting of the potentiometer 141 in series therewith. The capacitor 143 is also connected in the control circuit of another electric discharge device 159, preferably a thyratron, which is designated a "stop" valve. The anode 161 of the stop valve 159 is also connected to the positive terminal of the direct-current source 121 through the push button switch 135. The cathode 163 of the stop valve is connected to an intermediate tap 164 on the resistor 113. The control circuit of the stop valve may then be traced from the grid 165 through the grid resistor 167, another resistor 169, the capacitor 143, conductor 109, resistor 111 and the intermediate tap 164 of the resistor 113 to the cathode 163 of the valve.

A potential is impressed across the resistor 169 which is derived from the source 15 through an auxiliary transformer 171. The secondary 173 of the auxiliary transformer 171 is connected to the input terminals of a full-wave rectifier 175 through a capacitor 177. The output terminals of the rectifier 175 are connected across the resistor 169 and a filter capacitor 179 is connected in parallel with the resistor 169 to smooth out the voltage developed across the resistor. Thus, current flows from the secondary 173 through the capacitor 177, the rectifier 175 and the resistor 169. The reactance of the capacitor 177 is, of course, inversely proportional to the frequency of the alternating current which flows therethrough. Thus, when the frequency is high the capacitor 177 offers a low impedance to the flow of current and when the frequency is low, the capacitor 177 offers a high impedance to the flow of current. As a result, the magnitude of the potential developed across the resistor 169 by the flow of current therethrough is dependent upon the frequency of the source employed. The magnitude of the potential developed across the resistor 169 with a source having a frequency of 60 cycles per second is greater than with a source having a 50 cycles per second frequency.

When the resultant potential in the control circuit of the stop valve rises above the critical potential of the stop valve, the valve is rendered conductive. As shown in Fig. 2, the potential $P_{113}$ impressed in the control circuit of the stop valve by the resistors 113 and 111 is highly negative. The potential impressed in the control circuit across the other resistor 169 designated hereinafter as $P_f$ is positive but of a smaller magnitude than the negative potential. However, the magnitude of this positive potential $P_f$ is dependent upon the frequency of the source. For a 60 cycles per second frequency, the magnitude of the positive potential is as shown by the line $P_{60}$ in Fig. 2. For a 50 cycle per second frequency, the magnitude of the positive potential is $\frac{5}{6}$ $P_{60}$ as shown by the line $P_{50}$. The sum of the negative and positive potentials is then illustrated by lines $S_{60}$ and $S_{50}$. When the start valve becomes conductive, the potential across the capacitor 143 gradually rises from zero at a rate determined by the setting of the potentiometer 141. When the capacitor potential, $P_c$ in Fig. 2, is added to the other potentials in the control circuit of the stop valve, the resultant potential rises above the critical potential of the stop valve after a time interval whose length depends upon the magnitude of the positive potential. The critical potential, $P_a$ in Fig. 2, is approximately $-6$ volts for the KU-627 thyratron employed in the commercial structure manufactured by Westinghouse Electric & Manufacturing Company. In Fig. 2 the curves $P_{r60}$ and $P_{r50}$ represent the sum of $P_c$, $P_{60}$ and $P_{113}$ and the sum of $P_c$, $P_{50}$ and $P_{113}$ respectively.

At the top of Fig. 2 a curve 181 illustrates the relationship of frequency to time in seconds required to conduct 10 cycles of current to the welding transformer. Ten cycles was chosen because it is typical of the requirements of welding apparatus of this type. The straight line 183 illustrates the time interval which is measured out by the start and stop valves with sources having various frequencies. It is to be noted that although the time measured by the start and stop valves does not exactly follow the time required to pass 10 cycles of current at the various frequencies, the difference in time is so slight that the number of cycles and even of half-cycles of current, which is passed, remains constant over a substantial range of source frequencies. As is well known, an ignitron after being rendered conductive continues to conduct current until the end of the half-period of the source. The apparatus, is therefore, always set so that the stop valve becomes conductive a short time before it is desired to stop conduction of the ignitron. Therefore, the very slight difference in time is of no practical importance.

As the negative potential $P_{113}$ remains substantially constant, the relationship of the magnitudes of the negative and positive potentials in the control circuit of the stop valve is important in determining the position of the line 183 in Fig. 2. The magnitude of the positive potential $P_f$ (such as $P_{60}$ or $P_{50}$ in Fig. 2) is in direct proportion to the frequency of the source, while the magnitude of the negative potential $P_{113}$ remains constant and the magnitude of the capacitor potential $P_c$ increases at a fixed rate. Therefore, a plotting of the resultant potential $P_{rf}$ (such as $P_{r60}$ or $P_{r50}$ in Fig. 2) forms a right triangle with the resultant potential as the hypotenuse and the time along the critical potential line $P_a$ as one leg of the triangle, and the algebraic sum of the negative, positive and critical potentials as the other leg. To conduct the same number of half-cycles of current through the ignitrons requires a longer time at a frequency of 50 cycles per second than at a frequency of 60 cycles per second. The ratio of these times is obviously the inverse ratio of the frequencies. It follows that the ratio of the algebraic sum $S_f$ (such as $S_{60}$ or $S_{50}$ in Fig. 2) of the negative and positive potentials minus the critical potential at any two frequencies ($f$ and $f_1$) must be the inverse ratio of the frequencies. Thus, $$\frac{S_f - P_a}{S_{f1} - P_a} = \frac{f1}{f}$$

or $$f[(P_{113} + P_f) - P_a] = f1[(P_{113} + P_{f1}) - P_a]$$

but $$P_{f1} = \frac{f1}{f} P_f$$

then $$P_{113}(f - f1) = -P_f\left(\frac{f^2 - f1^2}{f}\right) + P_a(f - f1)$$

and $$P_{113} = -P_f\left(\frac{f + f1}{f}\right) + P_a$$

It is then apparent that the negative potential $P_{113}$ must be equal in magnitude to the magnitude of the positive potential $P_f$ at one of the frequencies times the ratio of the sum of said frequencies to said one frequency plus the critical potential. By proper adjustment of the magnitudes of the negative and positive potentials, it is possible to set the apparatus so that the time interval in which current is supplied to the load with either of two preselected source frequencies is exactly that required to supply a given number of half-cycles of current.

As illustrated in Fig. 2 the time interval in which current is supplied is exactly that required to supply 10 cycles of current at either 50 cycles per second or 60 cycles per second frequency. By virtue of the characteristics of the ignitrons the same number of cycles of current is supplied to the load with source frequencies ranging from at least a frequency of 65 cycles per second to 45 cycles per second.

While the start valve 131 is conductive, the biasing potential in the control circuit of the control valve is such that the grid 87 is less negative with respect to the cathode 117, than before. A second phase-shifting circuit 185 is energized from the alternating current source 15 through transformer 99. The potential derived therefrom is rectified by the rectifier system 187 and impressed across the resistor 101 in the control circuit of the control valve 77. The direction of rectification is such that the potential appearing across the resistor has the wave form of an inverted rectified alternating potential with respect to the grid. The magnitude of the biasing potential in the control circuit is now such that the peaks of the inverted rectified alternating potential appearing across the resistor 101 rise above the critical potential value of the control valve. The phase position of the potential across the resistor 101 is adjusted to determine the instant in a half-period of the alternating source at which the control valve 77 is rendered conductive. When the stop valve 159 becomes conductive, the intermediate tap of the resistor 113 is connected through the stop valve to the positive terminal of the direct-current source 121. Thus, the terminal of the resistor 113 which is connected to the cathode 117 of the control valve again becomes positive with respect to the grid 87 and the control valve is maintained non-conductive.

To initiate a welding operation, the push-button switch 135 is closed. The start valve 131 then becomes conductive when the next potential impulse is impressed across the resistor 151 in its control circuit. When the start valve 131 becomes conductive, the peaks of the inverted rectified alternating potential supplied across the resistor 101 rise above the critical potential value of the control valve 77 in each half-period of the source. As the control valve 77 becomes conductive in each half-period, the firing tubes 21 and 23 and their associated ignitrons 17 and 19 are rendered conductive in alternate half-periods. The balancing bridge 93 in the control circuit of the control valve 77 ordinarily does not affect the control potential. However, if the firing characteristics of the ignitrons 17 and 19 should differ, the bridge 93 may be set so that it is slightly unbalanced. As a result, the control potential becomes slightly higher in the half-periods of the alternating potential in which one ignitron is rendered conductive than in the other half-periods and so compensates for the difference in the ignitron characteristics.

When the start valve 131 becomes conductive, charging of the capacitor 143 in the control circuit of the stop valve 159 at a preselected rate is also initiated. After a time interval which is dependent upon the frequency of the source, the potential across the capacitor 143 rises to such magnitude that the resultant potential in the control circuit of the stop valve 159 renders it conductive. Upon the stop valve 159 becoming conductive, the biasing potential in the control circuit of the control valve 77 is such that the grid 87 is highly negative relative to the cathode 117 to prevent further conduction by the control valve 77 and, therefore, render the ignitrons 17 and 19 non-conductive. Another welding operation may be initiated by releasing the push button switch and then reclosing it. A second contactor 189 on the push button switch is closed when the switch is released to complete a discharging circuit for the capacitor 143 and condition the capacitor for a succeeding operation.

The control circuit of the stop valve is described as having impressed therein a biasing potential the magnitude of which is dependent upon the frequency of the source and the potential across the capacitor 143 which increases in magnitude at a fixed rate. However it is obvious that a valve of this type may be controlled in a manner dependent upon the frequency of the source by impressing in its control circuit a biasing potential the magnitude of which is dependent upon the frequency and a potential the magnitude of which varies in any manner, whether in accordance with a preselected program or not.

Although I have shown and described a specific embodiment of my invention, I am fully aware that many modifications thereof are possible. My invention, therefore, is not to be restricted except insofar as is necessitated by the prior art and the spirit of the appended claims.

I claim as my invention:

1. A timing system comprising, a source of periodically pulsating current, an electric discharge valve of the arc-like type having a plurality of principal electrodes, means for impressing a potential across said principal electrodes, a control circuit for said valve, and means for impressing in said control circuit a potential which varies in magnitude superimposed on a potential the magnitude of which is dependent upon the frequency of said current, said valve being rendered conductive when the resultant potential impressed in said control circuit rises above a predetermined critical value.

2. A timing system comprising, a source of periodically pulsating current, an electric discharge valve of the arc-like type having a plurality of principal electrodes, means for impressing a potential across said principal electrodes, a control circuit for said valve, and means for impressing in said control circuit a potential which varies in magnitude in accordance with a predetermined program superimposed on a potential the magnitude of which depends upon the frequency of said source, said valve being rendered conductive when the resultant potential impressed in said control circuit rises above a predetermined critical value.

3. A timing system comprising, a source of periodically pulsating current, an electric discharge valve of the arc-like type having a plurality of principal electrodes, means for impressing a potential across said principal electrodes, a control circuit for said valve, and means for impressing in said control circuit a potential which increases at a preselected rate superimposed on a potential the magnitude of which is dependent upon the frequency of said current, said valve being rendered conductive when resultant potential impressed in said control circuit rises above a predetermined critical value.

4. A timing system comprising, a source of periodically pulsating current, an electric discharge valve of the arc-like type having a plurality of principal electrodes, means for impressing a potential across said principal electrodes, a control circuit for said valve, means for impressing in said control circuit a first potential the magnitude of which is dependent upon the frequency of said current, and means operable at a selected instant for impressing in said control circuit a second potential the magnitude of which increases at a preselected rate, said valve being rendered conductive when the resultant potential impressed in said control circuit rises above a predetermined critical value, said resultant potential being below said critical value when said second potential is first impressed in said control circuit whereby the length of time between said selected instant and the instant said valve is rendered conductive depends upon the frequency of said current.

5. A timing system comprising, a source of alternating current, an electric discharge valve of the arc-like type having a plurality of principal electrodes, means for impressing a potential across said principal electrodes, a control circuit for said valve, means for impressing in said control circuit a potential the magnitude of which is dependent upon the frequency of said current including a resistor in the control circuit, a capacitor and means for supplying current from said source through said capacitor to said resistor, and means for impressing in said control circuit a potential which varies in magnitude, said valve being rendered conductive when the resultant potential in said control circuit rises above a predetermined critical value.

6. A timing system comprising, a source of alternating current, an electric discharge valve of the arc-like type having a plurality of principal electrodes, means for impressing a potential across said principal electrodes, a control circuit for said valve, means for impressing in said control circuit a potential the magnitude of which is dependent upon the frequency of said alternating current comprising a full wave rectifier supplied with current from said source and a capacitance connected between said rectifier and source, and means for also impressing in said control circuit a potential which varies in magnitude, said valve being rendered conductive when the resultant potential in said control circuit rises above a predetermined critical value.

7. A timing system comprising, a source of alternating current, an electric discharge valve of the arc-like type having a plurality of principal electrodes, means for impressing a potential across said principal electrodes, a current circuit for said valve, a resistor in said control circuit, a full wave rectifier having input and output terminals, means for connecting said resistor across said output terminals, means for supplying from said alternating-current source to said input terminals including a capacitor connected between said input terminals and source, whereby a potential is developed across said impedance means the magnitude of which is dependent upon the frequency of said alternating current, and means for impressing in said control circuit a potential which varies in magnitude, said valve being rendered conductive when the resultant potential in said control circuit rises above a predetermined critical value.

8. For use in supplying power to a load from a source of periodically pulsating potential, the combination comprising valve means interposed between said source and load, means for placing said valve means in one condition with respect to conductivity, and means for changing said valve means to another condition with respect to conductivity after an interval of time the length of which is dependent upon the frequency of said source.

9. For use in supplying power to a load from a source of alternating current, the combination comprising valve means interposed between said source and load, starting means for rendering said valve means conductive, stopping means for rendering said valve means non-conductive, and timing means initiated by said starting means and including means responsive to the frequency of said source for operating said stopping means after an interval of time the length of which is dependent upon the frequency of said source.

10. For use in supplying power to a load from one of a plurality of sources of periodically pulsating current having different frequencies, the combination comprising valve means interposed between the source employed and the load, means for placing said valve means in one condition with respect to conductivity and means for changing said valve means to another condition with respect to conductivity a preselected interval thereafter measured in terms of periods of the current including means for maintaining said interval substantially constant regardless of which of said sources is employed.

11. For use in supplying power to a load from one of a plurality of sources of periodically pulsating current having different frequencies, the combination comprising valve means interposed between the source employed and the load, means for rendering said valve means conductive, and means for rendering said valve means non-conductive a preselected interval thereafter measured in terms of periods of said current including means responsive to the frequency of said current for maintaining said interval substantially constant regardless of which of said sources is employed.

12. For use in supplying power to a load from a source of periodically pulsating current, the combination comprising valve means interposed between said source and load, starting means for rendering said valve means conductive, stopping means including an electric discharge device of the arc-like type associated with said valve means to render it non-conductive when said device becomes conductive, a control circuit for rendering said device conductive upon an impressing therein of a potential greater than a predetermined critical value, means for impressing in said control circuit a potential the magnitude of which is less than said critical value and is dependent upon the frequency of said source, and means initiated by said starting means for impressing in said control circuit a potential which increases at a preselected rate.

13. For use in supplying power to a load from a source of periodically pulsating current, the combination comprising valve means interposed between said source and load, starting means for rendering said valve means conductive, stopping means including an electric discharge device of the arc-like type associated with said valve means to render it non-conductive when said device becomes conductive, a control circuit for rendering said device conductive upon an impressing therein of a potential greater than a predetermined critical value, means for impressing a negative potential in said control circuit, means for impressing in said control circuit a positive potential the magnitude of which is dependent upon the frequency of said source, the sum of said negative and positive potentials being less than said critical value, and means initiated by said starting means for impressing in said control circuit a potential which increases at a preselected rate.

14. For use in supplying current to a load from either of two sources having different frequencies, the combination comprising valve means interposed between the source employed and the load, starting means for rendering said valve means conductive, stopping means including an electric discharge device of the arc-like type associated with said valve means to render it non-conductive when said device becomes conductive, a control circuit for rendering said device conductive upon the impressing therein of a potential greater than a predetermined critical value, means for impressing a negative potential in said control circuit, means for impressing in said control circuit a positive potential the magnitude of which is dependent upon the frequency of said source, the sum of said negative and positive potentials being less than said critical value, and means initiated by said starting means for impressing in said control circuit a potential which increases at a preselected rate, said negative potential having a magnitude equal to the magnitude of said positive potential at one of said frequencies times the ratio of the sum of said frequencies to said one frequency plus the critical value.

15. For use in supplying power to a load from a source of alternating current, the combination comprising valve means interposed between said source and load, starting means for rendering said valve means conductive, stopping means for rendering said valve means non-conductive, and timing means initiated by said starting means and including means responsive to the frequency of said source for operating said stopping means after a preselected number of half-periods of said source.

16. For use in supplying power to a load from a source of periodically pulsating current, the combination comprising valve means interposed between said source and load, starting means for rendering said valve means conductive, stopping means including an electric discharge device of the arc-like type associated with said valve means to render it non-conductive when said device becomes conductive, a control circuit for rendering said device conductive upon an impressing therein of a potential greater than a predetermined critical value, means for impressing in said control circuit a potential the magnitude of which is less than said critical value and is dependent upon the frequency of said source, and means initiated by said starting means for impressing in said control circuit a potential which varies in magnitude in accordance with a predetermined program.

17. For use in supplying power to a load from a source of periodically pulsating current, the combination comprising valve means interposed between said source and load, starting means for rendering said valve means conductive, stopping means including an electric discharge device of the arc-like type associated with said valve means to render it non-conductive when said device becomes conductive, a control circuit for said device, means for impressing in said control circuit a potential the magnitude of which is dependent upon the frequency of said source, and means for also impressing on said control circuit a potential which varies in magnitude, said control circuit being effective to render said device conductive when the resultant potential impressed therein rises above a predetermined critical value.

SLAVO J. MURCEK.